(12) United States Patent
Sugiyama et al.

(10) Patent No.: US 11,960,079 B2
(45) Date of Patent: Apr. 16, 2024

(54) IMAGE DISPLAY DEVICE, WIRE GRID POLARIZING PLATE, METHOD OF MANUFACTURING PLATE, METHOD OF OBSERVING WIRE GRID POLARIZING PLATE, AND METHOD OF ESTIMATING POLARIZATION AXIS DIRECTION OF WIRE GRID POLARIZING PLATE

(71) Applicant: ASAHI KASEI KABUSHIKI KAISHA, Tokyo (JP)

(72) Inventors: Masaru Sugiyama, Tokyo (JP); Naoki Inoue, Tokyo (JP); Nao Kitamichi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/758,615

(22) PCT Filed: Oct. 24, 2018

(86) PCT No.: PCT/JP2018/039457
§ 371 (c)(1),
(2) Date: Apr. 23, 2020

(87) PCT Pub. No.: WO2019/082920
PCT Pub. Date: May 2, 2019

(65) Prior Publication Data
US 2021/0181504 A1 Jun. 17, 2021

(30) Foreign Application Priority Data
Oct. 24, 2017 (JP) .................................. 2017-204880

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/3058* (2013.01); *B60K 35/23* (2024.01)

(58) Field of Classification Search
CPC .. G02B 27/0101; G02B 5/3058; B60K 35/00; B60K 2370/1529; B60K 35/23
(Continued)

(56) References Cited

U.S. PATENT DOCUMENTS

| 2004/0065967 | A1 | 4/2004 | Tanaka |
| 2010/0296039 | A1 | 11/2010 | Zhao et al. |

(Continued)

FOREIGN PATENT DOCUMENTS

| CN | 101893731 A | 11/2010 |
| CN | 104280808 A | 1/2015 |

(Continued)

OTHER PUBLICATIONS

International Search Report, issued in PCT/JP2018/039457, PCT/ISA/210, dated Dec. 11, 2018.
(Continued)

*Primary Examiner* — Charles S Chang
(74) *Attorney, Agent, or Firm* — Birch, Stewart, Kolasch & Birch, LLP

(57) ABSTRACT

To provide an image display device for enabling a polarization axis direction of a reflection type polarizing plate to be identified with simplicity and accuracy, and enabling an adjustment in the polarization reflection axis direction to be made with high accuracy, a wire grid polarizing plate for enabling the polarization axis direction to be examined simply, and the like, a head-up display device (1) in the present invention is an image display device provided with an image display (14) that outputs image light which is polarized light, a reflection type polarizing plate (15) having
(Continued)

an reflecting surface (28) that reflects the image light, and a projection plate (11) onto which the image light reflected by the reflection type polarizing plate is projected, and is characterized in that the reflection type polarizing plate allows a bright line (B) as an indicator indicative of the polarization axis direction of the reflecting surface to be observed.

23 Claims, 6 Drawing Sheets

(51) Int. Cl.
  *G02B 5/30* (2006.01)
  *B60K 35/23* (2024.01)
(58) Field of Classification Search
  USPC ............................................. 349/96–98
  See application file for complete search history.

(56) References Cited

U.S. PATENT DOCUMENTS

| | | | |
|---|---|---|---|
| 2011/0115991 A1 | 5/2011 | Sawaki | |
| 2012/0206805 A1* | 8/2012 | Meng | G02B 5/008 359/487.03 |
| 2013/0077164 A1 | 3/2013 | Davis | |
| 2013/0120698 A1 | 5/2013 | Takakuwa et al. | |
| 2013/0250411 A1 | 9/2013 | Bangerter et al. | |
| 2014/0293142 A1 | 10/2014 | Kawazu et al. | |
| 2014/0346139 A1* | 11/2014 | Kim | G02B 5/3058 216/24 |
| 2015/0212239 A1* | 7/2015 | Park | G02B 5/3058 216/24 |
| 2016/0139313 A1* | 5/2016 | Kim | G02B 5/3058 359/485.05 |
| 2016/0266294 A1* | 9/2016 | Yoon | G02B 5/3058 |
| 2017/0315281 A1* | 11/2017 | Suto | G02B 5/30 |
| 2018/0081103 A1* | 3/2018 | Takeda | G02B 5/3058 |

FOREIGN PATENT DOCUMENTS

| | | |
|---|---|---|
| EP | 2264492 A1 | 12/2010 |
| JP | 11-237507 A | 8/1999 |
| JP | 2004-61870 A | 2/2004 |
| JP | 2004-126414 A | 4/2004 |
| JP | 2008-70782 A | 3/2008 |
| JP | 2010-79169 A | 4/2010 |
| JP | 2011-75968 A | 4/2011 |
| JP | 2012-27115 A | 2/2012 |
| JP | 2012-108468 A | 6/2012 |
| JP | 2015-7763 A | 1/2015 |
| JP | 2015-72396 A | 4/2015 |
| JP | 2015-148746 A | 8/2015 |
| JP | 2016-18059 A | 2/2016 |
| JP | 2016-27418 A | 2/2016 |
| KR | 10-2013-0107239 A | 10/2013 |
| TW | I499812 B | 9/2015 |

OTHER PUBLICATIONS

Written Opinion of the International Searching Authority, issued in PCT/JP2018/039457, PCT/ISA/237, dated Dec. 11, 2018.
Extended European Search Report, dated Jun. 18, 2021, for European Application No. 18870305.2.

* cited by examiner

IMAGE DISPLAY DEVICE, WIRE GRID POLARIZING PLATE, METHOD OF MANUFACTURING PLATE, METHOD OF OBSERVING WIRE GRID POLARIZING PLATE, AND METHOD OF ESTIMATING POLARIZATION AXIS DIRECTION OF WIRE GRID POLARIZING PLATE

TECHNICAL FIELD

The present invention relates to an image display device, wire grid polarizing plate used in the display, method of manufacturing the plate, method of observing the wire grid polarizing plate, and method of estimating a polarization axis direction of the wire grid polarizing plate.

BACKGROUND ART

In recent years, use has been increased in head-up display devices that are vehicle-borne display equipment. The head-up display device projects onto a projection plate, and is capable of superimposing scenery such as a road visually identified by a driver on an image of vehicle speed information and the like. Since a shift of the driver's eye point is reduced, it is possible to contribute to safe driving.

On the other hand, since the head-up display device is installed in the vicinity of the projection plate, there is the case where sunlight enters an optical system of the head-up display device. The head-up display device usually generates an image using a small liquid crystal display as an image display, however, there is the risk that sunlight arriving at an absorption type polarizing plate used on the liquid crystal display is absorbed and generates heat. Further, the head-up display device usually uses magnifying lens and/or mirror to enlarge an image generated by the small liquid crystal display, the sunlight entering the head-up display device increases a rate of arriving at the liquid crystal display, and there is fear that the inside of the head-up display device is destroyed.

As measures against such a matter, it is proposed to use a reflection type polarizing plate such as a wire grid polarizing plate as a reflecting mirror to reduce an effect of sunlight in half.

PRIOR ART DOCUMENT

Patent Document

Patent Document 1

Japanese Unexamined Patent Publication No. 2010-79169

Patent Document 2

Japanese Unexamined Patent Publication No. 2015-7763

DISCLOSURE OF INVENTION

Problems to be Solved by the Invention

In the above-mentioned head-up display device, image light generated by the liquid crystal display is polarized light, and needs to be matched with the polarization reflection axis direction of the reflection type polarizing plate used as a reflecting mirror. In the current head-up display device, a magnification ratio of the image is high, and in order to enhance uniformity of brightness of the image projected onto the projection plate, it is important to make an adjustment in the polarization reflection axis direction.

However, generally, it is difficult to visually identify the polarization axis (polarization absorption axis, polarization reflection axis or polarization transmission axis) direction of the polarizing plate. For example, a method is proposed where polarizing plates with known polarization axis directions are stacked and rotated, and a polarization axis direction of a polarizing plate targeted for measurement is measured from a change in the transmittance and the like thereof. However, the measurement is complicated, and it is not possible to measure the polarization axis direction with simplicity.

The present invention was made in view of such a respect, and it is an object of the invention to provide an image display device for recognizing a polarization axis direction of a reflection type polarizing plate to enable a polarization reflection axis direction to be adjusted with high accuracy, wire grid polarizing plate for enabling the polarization axis direction to be recognized easily, method of manufacturing the plate, method of observing the wire grid polarizing plate, and method of estimating the polarization axis direction of the wire grid polarizing plate.

Means for Solving the Problem

In the present invention, an image display device is provided with an image display that outputs image light which is polarized light, a reflection type polarizing plate having an reflecting surface that reflects the image light, and a projection plate onto which the image light reflected by the reflection type polarizing plate is projected, and is characterized in that the reflection type polarizing plate has an indicator indicative of a polarization axis direction of the reflecting surface.

The indicator indicative of the polarization axis direction of the reflecting surface means an indicator for enabling the polarization axis direction to be visually identified under a particular condition in the case that visual identification is always difficult, such as a method of causing fluorescent emission to indicate the polarization axis direction in the case of inputting light with a particular wavelength, another method of manufacturing a structure for emitting diffracted light to indicate the polarization axis direction and the like. The display form is not limited, and is capable of being a straight line easy to determine the direction, geometrical graphic and the like. Since the indicator appears under the particular condition, it is possible to apply the indicator inside a Usable region (effective region) of the reflection type polarizing plate, and it is possible to facilitate the adjustment and recognition in the polarization axis direction.

Further, in the present invention, it is preferable that the reflection type polarizing plate is a wire grid polarizing plate, the wire grid polarizing plate has a fine metal wire region, and that the fine metal wire region includes a plurality of fine metal wires extending in a predetermined direction, and further includes a fine metal wire having a structure different from that of peripheral fine metal wires.

Further, in the present invention, the fine metal wire region preferably includes the fine metal wire having a structure where a width or a height of the fine metal wire is different in a range of 3% to 60% from that of the peripheral fine metal wires.

Furthermore, in the present invention, it is preferable that the wire grid polarizing plate includes a substrate having a concavo-convex structure extending in a particular direction on a surface thereof, and that the plurality of fine metal wires is brought into contact with the concavo-convex structure of the substrate.

Still furthermore, in the present invention, the concavo-convex structure of the substrate preferably includes a convex portion having a structure where a width or a height is different in a range of 3% to 60% from that of peripheral convex portions.

The present invention is a wire grid polarizing plate having a fine metal wire region, and is characterized in that the fine metal wire region includes a plurality of fine metal wires extending in a predetermined direction, and further includes a fine metal wire having a structure different from that of peripheral fine metal wires.

Further, in the present invention, the fine metal wire region preferably includes a region where a fine metal wire is lacked, or the fine metal wire having a structure where a width or a height of the fine metal wire is different from that of the peripheral fine metal wires.

Furthermore, in the present invention, the fine metal wire region preferably includes the fine metal wire having a structure where a width or a height of the fine metal wire is different from that of the peripheral fine metal wires.

Still furthermore, in the present invention, an extension direction of the fine metal wire having the structure different from that of the peripheral fine metal wires is preferably substantially parallel with a direction in which the peripheral fine metal wires extend.

Further, in the present invention, the fine metal wire region preferably includes the fine metal wire having a structure where a width or a height of the fine metal wire is different in a range of 3% or more from that of the peripheral fine metal wires.

Furthermore, in the present invention, the fine metal wire region preferably includes the fine metal wire having a structure where the width or the height of the fine metal wire is different in a range of 10% or more from that of the peripheral fine metal wires.

Still furthermore, in the present invention, the fine metal wire region preferably includes the fine metal wire having a structure where the width or the height of the fine metal wire is different in a range of 15% or more from that of the peripheral fine metal wires.

Further, in the present invention, the fine metal wire region preferably includes the fine metal wire having a structure where the width or the height of the fine metal wire is different in a range of 20% or more from that of the peripheral fine metal wires.

Furthermore, in the present invention, the fine metal wire region preferably includes the fine metal wire having a structure where the width or the height of the fine metal wire is different in a range of 30% or more from that of the peripheral fine metal wires.

Still furthermore, in the present invention, the fine metal wire region preferably includes the fine metal wire having a structure where the width or the height of the fine metal wire is different in a range of 3% to 60% from that of the peripheral fine metal wires.

Further, in the present invention, a distance between fine metal wires in the fine metal wire region preferably ranges from 50 nm to 150 nm.

Furthermore, in the present invention, the distance preferably ranges from 50 nm to 120 nm.

Still furthermore, in the present invention, it is preferable that the plate includes a substrate having a concavo-convex structure extending in a particular direction on a surface thereof, and that the plurality of fine metal wires is brought into contact with the concavo-convex structure of the substrate.

Moreover, in the present invention, it is preferable that the plurality of fine metal wires is provided to be unevenly distributed on one-side surfaces of convex portions of the concavo-convex structure of the substrate.

Further, in the present invention, the concavo-convex structure of the substrate preferably includes a convex portion having a structure different from that of peripheral convex portions.

Furthermore, in the present invention, the concavo-convex structure of the substrate preferably includes the convex portion having a structure where a width or a height is different in a range of 3% to 60% from that of the peripheral convex portions.

Still furthermore, in the present invention, a distance between convex portions of the concavo-convex structure of the substrate preferably ranges from 50 nm to 150 nm.

Moreover, in the present invention, the distance preferably ranges from 50 nm to 120 nm.

Further, in the present invention, it is preferable that a length ranges from 50 nm to 800 nm in a direction in which extends the fine metal wire with the structure different from that of the peripheral fine metal wires included in the fine metal wire having the structure different from that of the peripheral fine metal wires.

Furthermore, in the present invention, the length in the direction in which extends the fine metal wire with the structure different from that of the peripheral fine metal wires is preferably a wavelength of light desired for polarization separation, or less.

Still furthermore, in the present invention, the fine metal wire region preferably includes an abnormal structure region including a plurality of fine metal wires having the structure different from that of the peripheral fine metal wires.

Further, in the present invention, a width in a perpendicular direction to a direction in which extend the fine metal wires of the abnormal structure region preferably ranges from 50 nm to 800 nm.

Furthermore, in the present invention, a width in the perpendicular direction to the direction in which extend the fine metal wires of the abnormal structure region is preferably a wavelength of light desired for polarization separation, or less.

Still furthermore, in the present invention, a width in the direction in which extend the fine metal wires of the abnormal structure region preferably ranges from 50 nm to 800 nm.

Further, in the present invention, in the direction in which extend the fine metal wires of the abnormal structure region, a width is preferably a wavelength of light desired for polarization separation, or less.

The present invention is characterized by observing the above-mentioned wire grid polarizing plate on the following condition.

Observation Condition:

Light is applied to a surface having the fine metal wire region of the wire grid polarizing plate, and the surface having the fine metal wire region of the wire grid polarizing plate is observed from an angle that is not a regular reflection direction of applied light.

The present invention is characterized by estimating a polarization axis direction of the wire grid polarizing plate by observing the wire grid polarizing plate by the above-mentioned method.

The present invention is a wire grid polarizing plate having fine metal wires extending in a predetermined direction, and is characterized by allowing a bright line (s) to be observed in the case of observing a surface having the fine metal wires of the wire grid polarizing plate on the following condition.

Observation Condition:

On a dark ambient condition, a white LED of a point light source is set, while being spaced a distance of 20 cm away from the surface having the fine metal wires of the wire grid polarizing plate, and unpolarized white light with illuminance of 3000 lux is applied to the surface having the fine metal wires of the wire grid polarizing plate. The surface having the fine metal wires of the wire grid polarizing plate is observed at all angles except an angle in the regular reflection direction in applying the white light to the wire grid polarizing plate.

Further, in the case of observing the surface having the fine metal wires of the wire grid polarizing plate on the above-mentioned condition, it is preferable that it is possible to observe a bright line(s) which extends in an approximately parallel or an approximately perpendicular direction to a polarization axis direction of the wire grid polarizing plate.

The present invention is a method of manufacturing a wire grid polarizing plate having a fine metal wire region, and is characterized by including a fine metal wire forming step of forming a plurality of fine metal wires extending in a predetermined direction on a substrate to be included in the fine metal wire region, and a step of forming a fine metal wire having a structure different from that of peripheral fine metal wires on the substrate to be included in the fine metal wire region at the same time or a different step as/from the fine metal wire forming step.

Further, in the present invention, it is preferable to include a concavo-convex structure forming step of forming a concavo-convex structure extending in the predetermined direction on the substrate, and a step of forming a convex portion having a structure different from that of peripheral convex portions on the substrate at the same time or a different step as/from the concavo-convex structure forming step.

Furthermore, in the present invention, it is preferable that the plurality of fine metal wires contains aluminum.

Advantageous Effect of the Invention

According to the image display device of the present invention, it is possible to easily adjust the polarization reflection axis direction of the reflection type polarizing plate used as a reflecting mirror, and it is thereby possible to enhance uniformity of brightness of the image projected onto the projection plate.

Further, in the wire grid polarizing plate of the present invention, the method of manufacturing the plate, the method of observing the wire grid polarizing plate, and the method of estimating the polarization axis direction the wire grid polarizing plate, it is possible to easily recognize the polarization axis direction.

BEST MODE FOR CARRYING OUT THE INVENTION

As one example of an image display device of the present invention, one Embodiment (hereinafter, abbreviated as "this Embodiment") of a head-up display device will be described below in detail with reference to drawings. In addition, the invention is not limited to the following Embodiment, and is capable of being carried into practice with various modifications within a scope of the subject matter. Further, as technical common knowledge, "linearly polarized light" includes not only completely linearly polarized light, and also slightly elliptical polarized light. In this Embodiment, elliptical polarized light such that a length of the minor axis with respect to a length of the major axis of the ellipse is 0.3 or less is regarded as linearly polarized light with the major axis direction being the vibration direction. Elliptical polarized light such that a length of the minor axis with respect to a length of the major axis of the ellipse is 0.1 or less is more preferable. Similarly, in the case of including a plurality of types of linearly polarized light, linearly polarized light with the highest intensity is assumed to be linearly polarized light of this Embodiment.

Figure 1:
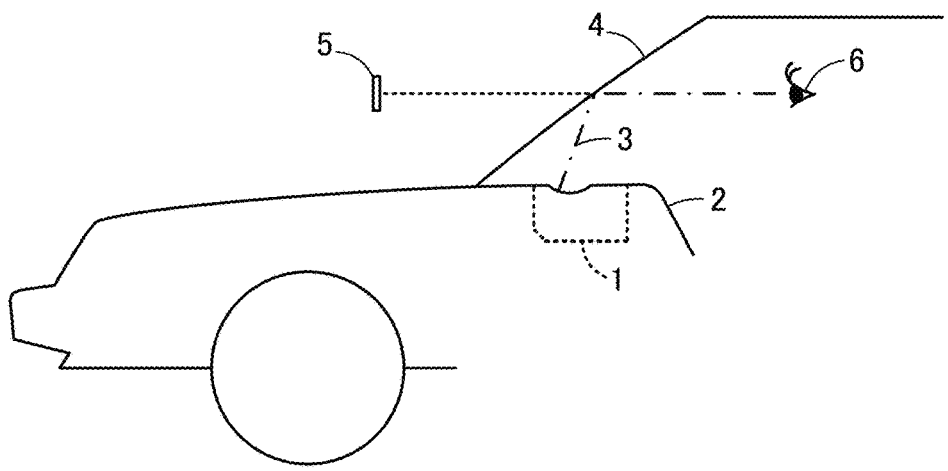
FIG. 1 is a conceptual view illustrating one example of an optical path until image light emitted by a head-up display device of this Embodiment is visually identified.

As shown in FIG. 1, for example, a head-up display device 1 is provided on a dashboard 2 of a vehicle, and is an image display device which projects image light (display light) 3 onto front glass 4 as a projection plate, and displays driving information as a virtual image 5. A driver 6 superimposes the virtual image 5 on scenery through the front glass 4, and is capable of visually identifying. In addition, as the projection plate, there is front glass of a car and a semi-permeable plate called a combiner.

Figure 2:
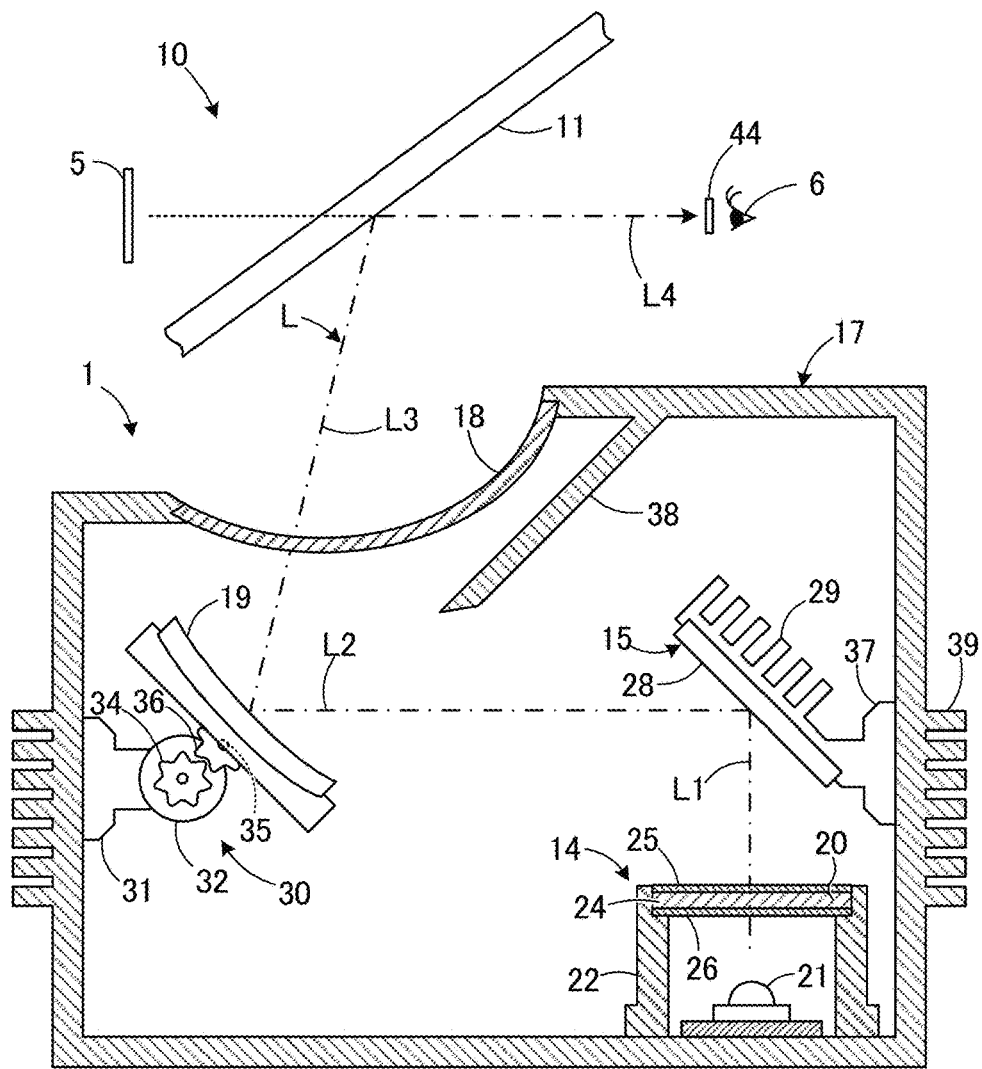
FIG. 2 is a cross-sectional schematic view illustrating the head-up display device according to this Embodiment.

As shown in FIG. 2, the head-up display device 1 of this Embodiment stores an image display 14, reflection type polarizing plate 15, reflector 30 and the like inside a housing 17, and the housing 17 is provided with a translucent window portion 18 to extract image light L.

In the image light L, the light which is output from the image display 14 and is input to the reflection type polarizing plate 15 is assumed to be first image light L1, and the light which is reflected by the reflection type polarizing plate 15 and is input to the projection plate 11 is assumed to be second image light L2, L3. In addition, as shown in FIG. 2, it is also possible that the device has the reflector 30 between the reflection type polarizing plate 15 and the projection plate 11, and it is also possible to use the reflector 30 as a concave mirror (hereinafter, referred to as a concave reflecting mirror 30) to enlarge a projection range of the image.

As the image display 14, there is a liquid crystal display, as a device for outputting the first image light L1 of linearly polarized light. The image display 14 has a liquid crystal display panel 20, a light source 21, and a holder 22 for holding the liquid crystal display panel 20, while storing the light source 21 inside. In addition, a reflector is set in the vicinity of the light source 21, and light from the light source 21 is reflected by the reflector toward the liquid crystal display panel 20.

The liquid crystal display panel 20 is provided with a liquid crystal cell 24 where liquid crystal is sealed in a pair of translucent substrates with transparent electrode films formed, a first linear polarizing plate 25 stuck to the output side of the liquid crystal display panel, i.e., the side opposite to the light source 21 of the liquid crystal cell 24, and a second linear polarizing plate 26 stuck to the light source 21 side of the liquid crystal cell 24.

The first linear polarizing plate 25 has an intrinsic polarization axis, polarizes light source light modulated by the liquid crystal cell 24 along the polarization axis to separate, and generates an image.

By the second linear polarizing plate 26, it is possible to control a polarized state of the light source light input to the liquid crystal cell 24. As the second linear polarizing plate 26, it is also possible to use a reflection type polarizing plate having an intrinsic polarization axis, and it is also possible to make an inclined arrangement at a distance without sticking to the liquid crystal cell 24 of the image display 14, and to locate a curve-shaped plate.

As the light source 21, any limitations are not imposed particularly, and it is possible to use a single or a plurality of light emitting diodes that emits white light and the like. In addition, it is possible to improve a light usage rate by providing a reflecting plate for reflecting light to the vicinity of the light source 21, and to improve uniformity of illuminance inside the surface of the liquid crystal display panel 20, by providing a diffusion plate, prism sheet and the like between the light source 21 and the liquid display panel 20.

The holder 22 is capable of having a mechanism for adjusting an installation direction of the liquid crystal display panel 20 in a rotation direction with the first image light L1 as a rotation center axis. By adjusting the installation direction, it is possible to change the polarization axis direction of the first linear polarizing plate 25 to adjust a polarized state of image light.

The reflection type polarizing plate 15 is supported on the inner surface of the housing 17 via a support member 37. The reflection type polarizing plate 15 is provided with a reflecting surface 28, and the image display 14 and reflection type polarizing plate 15 are set so that the first image light L1 output from the image display 14 is input in a slanting direction to the reflecting surface 28. Further, the support member 37 positioned on the backside of the reflection type polarizing plate 15 is preferably provided with a heatsink (radiating member) 29, and for example, the heatsink 29 is pre formed of a plurality of radiating fins.

As the reflection type polarizing plate 15, it is suitable to use a wire grid polarizer which has an intrinsic polarization reflection axis, and enables light with wavelengths of visible light to infrared light to be polarized and separated. In addition, the wire grid polarizer in the present Description is a generic name in the case of making the wire grid polarizing plate a part to be used in the head-up display device that is the image display device, and includes a polarizer obtained by sticking a wire grid polarizing plate comprised of a film substrate to a flat-shaped glass substrate and the like, another polarizer having a wire grid structure on a glass substrate, still another polarizer combined with other optical function material, and the like. As the wire grid polarizer, optical properties and shape are not limited, and it is possible to suitably use a flat-shaped polarizer, curve-shaped polarizer and the like.

In addition, the "intrinsic polarization reflection axis" means that a layer for performing polarization separation (polarization separation layer) has an intrinsic axis direction, and reflects or transmits each component of light with the vibration direction in the electric field parallel or orthogonal to the intrinsic axis direction. Accordingly, since the polarization axis direction of light subjected to polarization separation is not dependent on the incident direction and incident angle of light input to the reflection type polarizing plate 15, it is possible to apply polarization reflection, without changing a polarized state of light (first image light L1) input at a wide angle. Further, by enabling light with wavelengths of visible light to infrared light to be polarized and separated, since it is possible to remove a half the outside light with wavelengths of visible light to infrared light input to the image display 14 and optical members on the optical path of the image light, it is possible to prevent the image display 14 and optical members on the optical path of the image light from deteriorating by overheating.

Further, it is preferable to provide the backside of the reflection type polarizing plate 15 with a black layer to absorb passed light subjected to polarization separation, or a configuration and structure for preventing stray light from occurring.

As shown in FIG. 2, the second image light L2 reaches the concave reflecting mirror 30 from the reflection type polarizing plate 15, and is reflected by a non-spherical mirror 19.

The non-spherical mirror 19 shown in FIG. 2 is not limited particularly, as long as the mirror is capable of reflecting light with a predetermined wavelength. For example, it is possible to suitably use a metal-coated mirror using aluminum, silver, copper, platinum, gold or an alloy of these metals as a main constituent, and the like. As shown in FIG. 2, the non-spherical mirror 19 is formed in the shape of a concave surface, and by this means, is capable of enlarging the second image light L3 to output.

As shown in FIG. 2, the non-spherical mirror 19 is supported via an angle adjustment portion. The angle adjustment portion is provided with a support bench 31 attached to the inner surface of the housing 17, a stepping motor 32 provided on the support bench 31, a gear portion 34 attached to a rotation shaft of the stepping motor 32, and a gear portion 36 which meshes with the gear portion 34 and is attached to the non-spherical mirror 19 via a shaft portion 35. In the angle adjustment portion, by driving the stepping motor 32, each of the gear portions 34, 36 is rotated to enable the non-spherical mirror 19 to move in the rotation direction, and it is possible to adjust a projection direction of the second image light L3 onto the projection plate 11.

As shown in FIG. 2, the housing 17 has the translucent window portion 18, and the second image light L3 passes through the window portion 18, and reaches the projection plate 11 such as the front glass 4. The second image light L3 is reflected by the projection plate 11, and the third image light L4 reaches the driver (observer) 6. By this means, the driver 6 is capable of observing the virtual image 5 in the direction of the projection plate 11. In addition, a shading wall 38 is provided inside the housing 17, and by this shading wall 38, it is possible to prevent outside light such as sunlight from entering to be stray light. Further, a plurality of radiating fins 39 is provided on the outer surface of the housing 17. In addition, it is optional whether or not to provide the shading wall 38 or radiating fin 39.

In addition, as described above, the reflection type polarizing plate 15 is preferably a wire grid polarizer having the intrinsic polarization axis. As the polarization axis, there are a polarization reflection axis and a polarization transmission axis, and the axes are orthogonal to each other. Light of a polarization component parallel with the polarization transmission axis is transmitted, and light except such light is reflected. The first image light L1 input to the reflection type polarizing plate 15 from the image display 14 is linearly polarized light, and the polarization reflection axis is adjusted so that the linearly polarized light is reflected by the reflecting surface 28 of the reflection type polarizing plate 15.

Figure 3A:
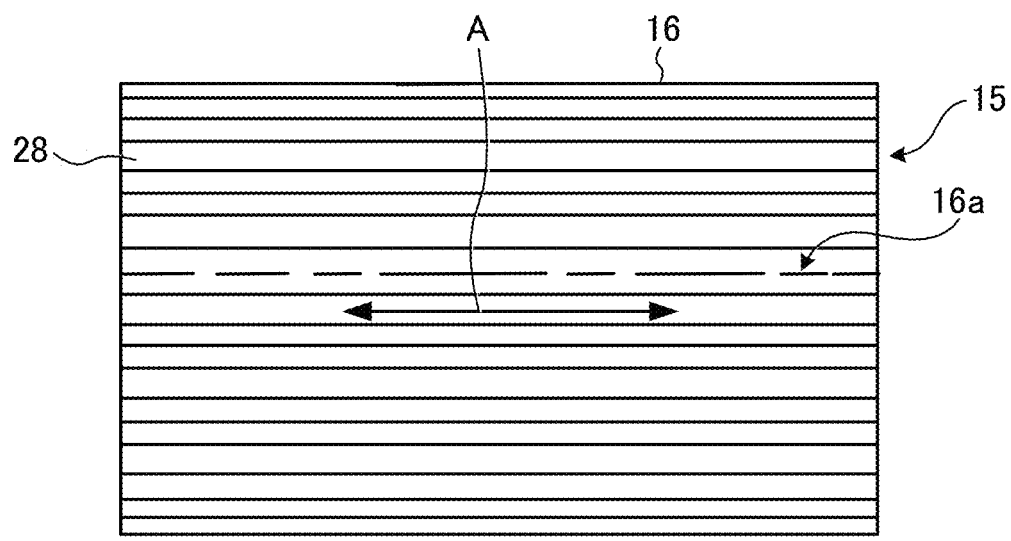
FIG. 3A is a plan view of a reflection type polarizing plate incorporated into the head-up display device.

As shown in FIG. 3A, the reflecting surface 28 of the wire grid polarizer that is the reflection type polarizing plate 15 is provided with a plurality of fine metal wires 16 extending in one direction (lateral direction in FIG. 3A). A region(s) with the plurality of fine metal wires provided is assumed to be a fine metal wire region. The extension direction of the fine metal wires 16 is substantially parallel with the polarization reflection axis direction A. However, visual identification of the extension direction of the fine metal wires 16 is difficult except microscopic observation, for example, using an electron microscope.

Figure 3B:
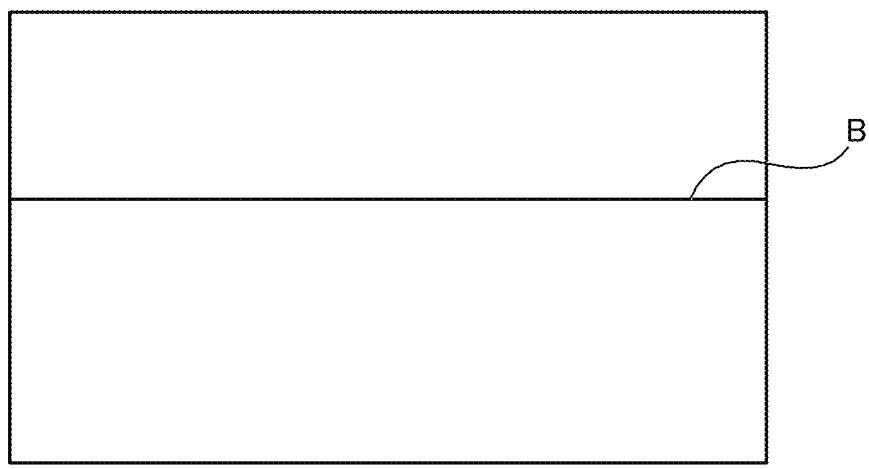
FIG. 3B is a schematic view in observing a surface of the reflection type polarizing plate, for example, using a differential interference microscope.

Therefore, the inventors of the present invention manufactured a region 16a of a fine metal wire 16 with a structure different from that of surroundings, inside the plurality of fine metal wires 16 to provide a region for emitting diffracted light in reflection observation, and as shown in FIG. 3B, enabled the region 16a to be recognized as a bright line B by macroscopic observation.

A period of the fine metal wire 16 constituting the wire grid polarizer is preferably ⅓ to ¼ of a wavelength of light desired for polarization separation, and by this means, it is possible to transmit light of a polarization component orthogonal to the direction in which the fine metal wire 16 extends. The region 16a of the fine metal wire 16 with the structure different from that of surroundings as described above means a region where adjacent fine metal wires 16 are coupled or intermittent, a distance between fine wires is decreased by increasing a width of the fine metal wire, or the distance between fine wires is increased by decreasing the width of the fine metal wire. By making different from the surroundings, diffraction occurs.

The direction in which the region 16a extends is not limited, but it is preferable that the direction is substantially parallel or substantially orthogonal to the direction in which the fine metal wires 16 extend. It is because the polarization reflection axis and polarization transmission axis are substantially parallel or orthogonal to the extension direction of the fine metal wires 16, it is possible to reduce the fear of misidentify the diffracted light of the region and the polarization axis direction, and further, it is possible to facilitate manufacturing. Moreover, in order to enable the polarization transmission axis and polarization reflection axis to be understood easily, it is also effective to make an interval at which diffracted light occurs different between the polarization transmission axis direction and the polarization reflection axis direction.

Further, the region 16a is preferably linear, and a width thereof is preferably a wavelength of desired light or less. The desired wavelength is a wavelength of light to be input to the wire grid polarizer and subjected to polarization separation, and when the light is visible light of 550 nm wavelength, the width of the region 16a is preferably 550 nm or less. When the width of the region 16a is increased, the diffracted light is strengthened, or inconsistencies in density such that the reflected light is diffused occurs, and in an application using regular reflection light, there is the risk that usage efficiency is decreased.

Thus, in order to grasp the extension direction of the fine metal wires 16, conventionally, there has been the need for performing microscopic observation of the order of nanometers, and as in this Embodiment, for example, by providing the fine metal wires 16 with the intermittent region 16a in the extension direction of the fine metal wires 16, instead of microscopic observation, also in macroscopic observation, it is possible to properly grasp the extension direction of the lattice stripe 16, i.e., the polarization reflection axis direction A of the reflection type polarizing plate 15.

Herein, observation conditions will be described. On a dark ambient condition, a white LED of a point light source is set, while being spaced a distance of 20 cm away from the surface having the fine metal wires of the wire grid polarizer, and unpolarized white light with illuminance of 3000 lux is applied to the surface having the fine metal wires 16 of the wire grid polarizer. An observer makes visual observation of the wire grid polarizer at all angles different from the normal reflection direction in applying the white light to the wire grid polarizer. For example, the "visual observation" in this Embodiment refers to observing macroscopically, and specifically, to observing by the naked eye.

In the wire grid polarizing plate of this Embodiment, it is possible to observe the bright line B in observing on the above-mentioned observation condition, and it is thereby possible to easily estimate the polarization axis direction. The direction in which the bright line B extends may be the transmission axis direction of the wire grid polarizing plate, or may be the reflection axis direction. The bright line B is preferably a bright line extending in an approximately parallel or approximately perpendicular direction to the polarization axis direction of the wire grid polarizer in observing the wire grid polarizing plate on the above-mentioned observation condition. It is essential only that the above-mentioned observer is capable of observing the bright line B at some angle among the angles at which the observer makes visual observation of the wire grid polarizer.

Figure 8:
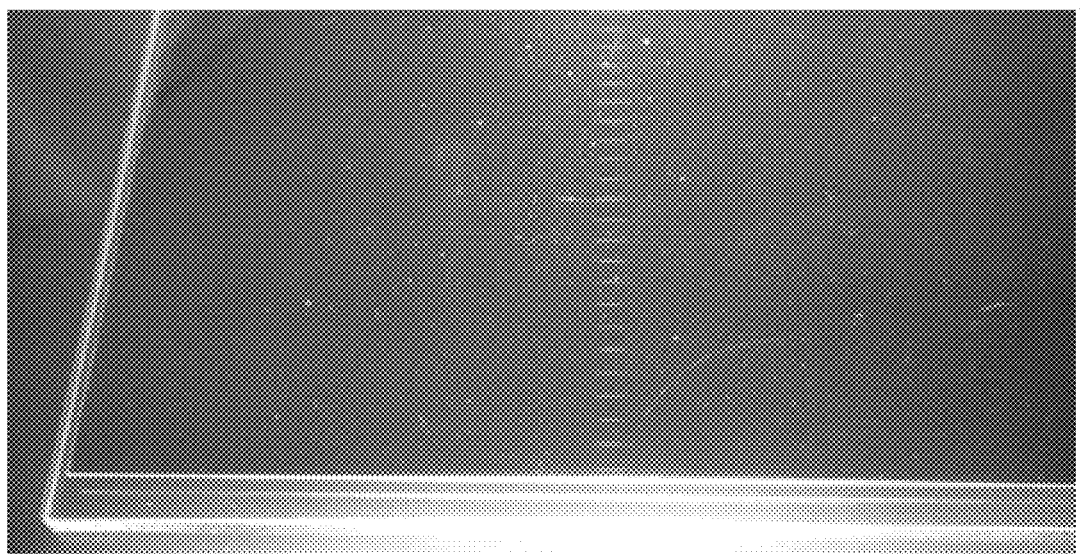
FIG. 8 is a view in observing the wire grid polarizing plate of this Embodiment.

FIG. 8 is a view in observing the wire grid polarizing plate of this Embodiment on the above-mentioned observation condition, and it is possible to observe the bright line.

As described above, according to the head-up display device 1 of this Embodiment, since it is possible to easily adjust the polarization reflection axis direction A of the reflection type polarizing plate 15 used as the reflecting mirror, it is possible to enhance uniformity of brightness of the image projected onto the projection plate 11.

In addition, in this Embodiment, the extension direction of the fine metal wires 16 is parallel with the direction in which the region 16a of the fine metal wire with the structure different from that of the surroundings extends, and in applying strong light (no distinction of polarized light/natural light) to the reflecting surface 28 of the reflection type polarizing plate 15, it is possible to observe the bright line B that is diffracted light.

In other words, in this Embodiment, "having an indicator indicative of the polarization reflection axis direction A" specifically refers to the bright line B observed in performing macroscopic observation.

In this Embodiment, the reflection type polarizing plate 15 is preferably a wire grid polarizer. As described above, the wire grid polarizer is a name of a part incorporated into the head-up display device. The case will be described below where a wire grid polarizing plate having fine metal wires on a film substrate is stuck to a glass substrate.

Figure 4:
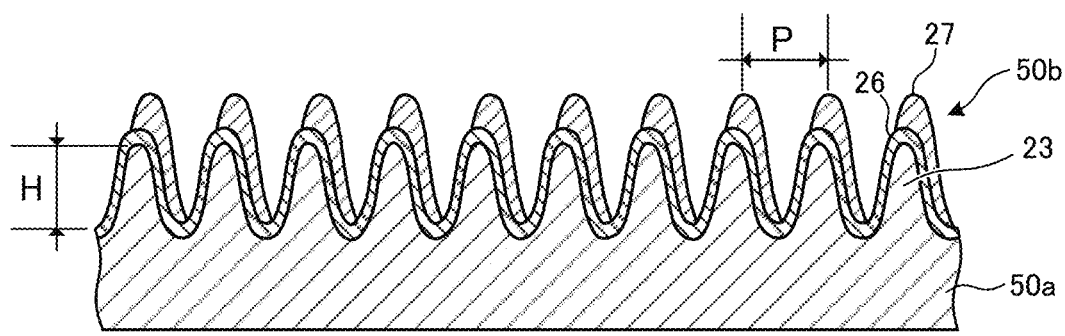
FIG. 4 is a partial cross-sectional schematic view of the wire grid polarizing plate.

As shown in FIG. 4, the wire grid polarizing plate has a substrate 50$a$, and a polarization separation layer 50$b$ provided on the surface of the substrate 50$a$ to be comprised thereof. In addition, the substrate 50$a$ is preferably a film, by this means, it is possible to perform production consecutively by winding, and it is thereby possible to make the cost inexpensive.

As shown in FIG. 4, a plurality of array of convex portions 23 is provided on the surface of the substrate 50$a$. As shown in FIG. 4, a fine metal wire (metal wire) 27 is formed in at least a part of the surface of each of the array of convex portions 23 via a dielectric layer 26. The dielectric layer 26 may not be formed. In such a case, the fine metal wire 27 is directly formed on the surface of the array of convex portion 23.

The fine metal wires 27 are aligned at approximately regular intervals. As shown in FIG. 4, by preparing a plurality of array of convex portions 23 on the surface of the substrate 50$a$ to form the concavo-convex structure, a contact area between the fine metal wires 27 and the substrate 50$a$ is enlarged, and durability against physical external force is improved. By this means, a protective film is allowed to be used on the fine metal wires 27, and handling of the wire grid polarizing plate is made ease.

As shown in FIG. 4, the wire grid polarizing plate used as the reflection type polarizing plate 15 has the substrate 50$a$ having the concavo-convex structure extending in a predetermined direction on the surface, and the fine metal wires 27 provided to be unevenly distributed on one-side surfaces of the array of convex portions 23 of the concavo-convex structure.

Then, in the wire grid polarizing plate, as shown in FIG. 3B, in order to enable the bright line B and the like as an indicator indicative of the polarization reflection axis direction A to be observed, for example, a region (s) where the fine metal wires 27 are intermittent is extended in the extension direction of the concavo-convex structure (fine metal wires 27). In other words, when the description is given according to FIG. 3A, the extension direction of the fine metal wire 16 is the extension direction of the fine metal wire 27 (concavo-convex structure), and as in the intermittent region 16$a$ of the fine metal wire 16 in FIG. 3A, the fine metal wire 27 is formed intermittently, and such an intermittent region is provided in the extension direction of the fine metal wire 27. By this means, in macroscopic observation shown in FIG. 3B, for example, it is possible to observe the bright line B as the indicator indicative of the polarization axis reflection axis direction A. Accordingly, it is possible to easily adjust the polarization reflection axis direction A of the wire grid polarizing plate, and in the head-up display device 1 shown in FIG. 1, it is possible to enhance uniformity of brightness of the image projected onto the projection plate 11.

Figure 5:
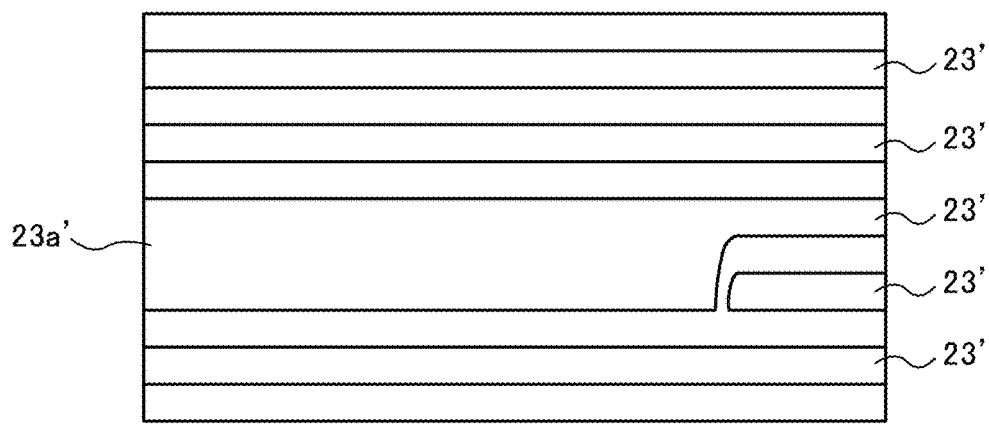
FIG. 5 shows one example of a plan schematic view illustrating a surface of a wire grid polarizing plate of this Embodiment.

Further, a wire grid polarizing plate of another Embodiment will be described. For example, as shown in FIG. 5, among fine metal wires, for example, adjacent fine metal wires 23' are coupled. The coupling part is shown by numerical reference 23$a'$. Thus, also by coupling fine metal wires 23', in macroscopic observation, for example, it is possible to observe the bright line B as the indicator indicative of the polarization reflection axis direction.

Alternatively, also when the fine metal wire 23' extends in the extension direction, in macroscopic observation, for example, it is possible to observe the bright line B as the indicator indicative of the polarization reflection axis direction.

Figure 6:
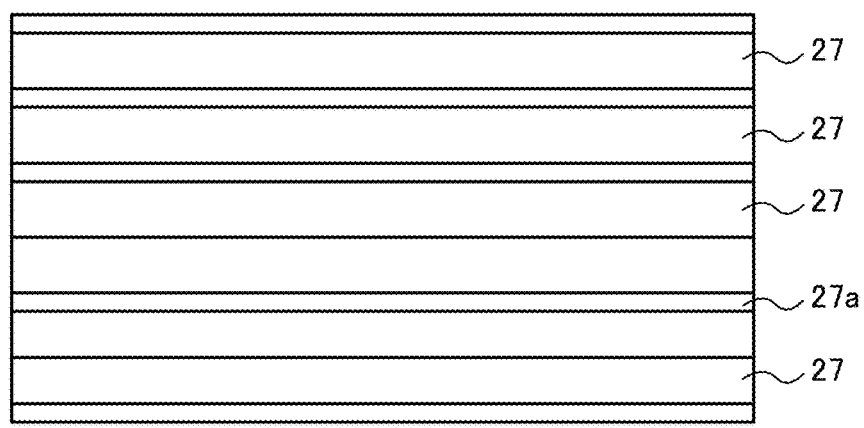
FIG. 6 shows one example of the plan schematic view illustrating the surface of the wire grid polarizing plate of this Embodiment.

Further, as shown in FIG. 6, among the fine metal wires 27, in a fine metal wire 27$a$, a fine wire width is narrower than that of peripheral fine metal wires 27. Instead of that the fine wire width of the fine metal wire 27$a$ is not narrow in the entire extension direction, it may be configured that the fine wire width is narrow in a part of the region of the fine metal wire 27$a$, and that the region with the narrow fine wire width extends in the extension direction of the fine metal wire. Alternatively, among the fine metal wires 27, it may be configured that the fine wire width is wider than that of peripheral fine metal wires 27, and that such a region with the wide fine wire width extends in the extension direction of the concavo-convex structure. Also by this means, in macroscopic observation, for example, it is possible to observe the bright line B as the indicator indicative of the polarization axis direction.

A period of the fine metal wires 27 and a period (pitch P between array of convex portions 23) (see FIG. 4) of the concavo-convex structure, i.e., distances of the fine metal wires 27 and the convex portions 23 are not limited particularly, and in the case of considering use of light in a visible light region, the period of the fine metal wires 27 and the period of the concavo-convex structure of the substrate 50$a$ are preferably 150 nm or less, more preferably 130 nm or less, further preferably 120 nm or less, and most preferably 100 nm or less. The lower limit of the period of the fine metal wires 27 and the period of the concavo-convex structure of the substrate 50$a$ are not particularly limited, and from the viewpoint of manufacturing easiness, the lower limit is preferably 50 nm or more, more preferably 60 nm or more, and further preferably 80 nm or more. As the period of the fine metal wires 27 is shorter, observation of the bright line B (see FIG. 3B) indicative of the polarization axis direction is easier, being preferable.

Further, from the viewpoint of facilitating observation of the bright line B, the fine metal wire having the structure different from that of surroundings has a structure where a width or height is preferably different from that of peripheral fine metal wires 27 in a range of 3% or more, more preferably different in a range of 5% or more, further preferably different in a range of 10% or more, further more preferably different in a range of 15% or more, particularly preferably different in a range of 20% or more, and most preferably different in a range of 30% or more. The upper limit is not particularly limited, and the structure is preferably different in a range of 60% or less, more preferably different in a range of 50% or less, and further preferably different in a range of 40% or less. Herein, a length of a part where a width of the metal is the thickest in a cross-sectional view of the fine metal wire 27 is assumed to be a width of the fine metal wire 27 in the portion of the cross-sectional view. A length of apart where a height of the metal is the highest in a cross-sectional view of the fine metal wire 27 is assumed to be a height of the fine metal wire 27 in the portion of the cross-sectional view. From the viewpoint of facilitating observation of the bright line B, a length in the extension direction of the fine metal wire 27 with the structure different from that of surroundings is preferably a wavelength of light desired for polarization separation, or less. In more detail, the length preferably ranges from 50 nm to 800 nm, more preferably from 100 nm to 600 nm, and further more preferably from 100 nm to 500 nm.

From the viewpoint of facilitating observation of the bright line B, the concavo-convex structure of the substrate 50a preferably has the convex portion 23 with the structure different from that of peripheral convex portions 23, and has a structure where a width or height is preferably different in a range of 3% or more from that of peripheral metal convex portion 23, more preferably different in a range of 5% or more, further preferably different in a range of 10% or more, further more preferably different in a range of 15% or more, particularly preferably different in a range of 20% or more, and most preferably different in a range of 30% or more. The upper limit is not particularly limited, and the structure is preferably different in a range of 60% or less, more preferably different in a range of 50% or less, and further preferably different in a range of 40% or less. Herein, a length of a part where a width of the convex portion 23 is the thickest in a cross-sectional view of the convex-concavo structure of the substrate 50a is assumed to be a width of the convex portion 23 in the portion of the cross-sectional view. A length of a part where a height of the convex portion is the highest in a cross-sectional view of the concavo-convex structure of the substrate 50a is assumed to be a height of the convex portion 23 in the portion of the cross-sectional view.

In addition, the above-mentioned description is in the case where the extension direction of the fine metal wire is substantially parallel with the extension direction of the region different from that of surroundings. It is possible to substantially orthogonalize the directions, and both cases are capable of being carried into practice as appropriate.

Detailed descriptions will be given below to a method of manufacturing the wire grid polarizing plate in the case of having the concavo-convex structure and the like.

The substrate 50a is substantially transparent in a target wavelength region. For example, it is possible to use inorganic materials such as glass and resin materials, and it is preferable to use a film (resin materials). By using a resin substrate as the substrate 50a, there are merits that it is possible to provide with flexibility enabling roll process and the like. For example, among resins capable of being used in the substrate 50a are amorphous thermoplastic resins such as polymethylmethacrylate resin, polycarbonate resin, polystyrene resin, cycloolefin resin (COP), cross-linked polyethylene resin, polyvinyl chloride resin, polyacrylate resin, polyphenylene ether resin, modified polyphenylene ether resin, polyether imide resin, polyether sulfone resin, polysulfone resin and polyether ketone resin, crystalline thermoplastic resins such as polyethylene terephthalate (PET) resin, polyethylene naphthalate resin, polyethylene resin, polypropylene resin, polybutylene terephthalate resin, aromatic polyester resin, polyacetal resin, and polyamide resin, ultraviolet (UV) curable resins of acrylic system, epoxy system, urethane system and the like, thermosetting resins and the like. In addition thereto, there are triacetate resin (TAC) and the like, and specifically, it is possible to suitably use TD80UL and ZRD60SL made by FUJIFILM Corporation, KC6UA made by Konica Minolta, Inc., and the like. Further, it is possible to combine the UV-curable resin and thermosetting resin, the above-mentioned thermoplastic resin, and triacetate resin, or use alone to form the substrate. In addition, as a method of coating with the UV-curable resin, in addition to a gravure scheme using a gravure roll, slot die scheme, and knife coating scheme, there are an inkjet scheme, spray coating scheme using an electric potential difference and the like. Further, to cure, it is also possible to use UV light, a light source for emitting visible light of about 405 nm wavelength in consideration of absorption in an added ultraviolet absorber, and a light source for emitting an electron beam.

The concavo-convex structure having the array of convex portions 23 formed on the surface of the substrate 50a is preferably in a rectangular shape in a section perpendicular to the extension direction of the concavo-convex structure. The rectangular shape is made of repetition of the concave portion and convex portion, and includes the shape of a trapezoid, the shape of a rectangle and the shape of a square. Further, it is also possible to have a curved portion such that the curvature changes gently like a parabola at the front and back of the inflection point in the case of regarding the outline of the concavo-convex structure in the cross-sectional view as a function, and it is possible to also include the shape that the convex portion has a constriction. The shape of the concavo-convex structure facilitates forming of the fine metal wires in the shape continuous in the vertical direction, while spacing between the fine metal wires, by the oblique deposition method, on side surfaces of the convex portions and bottoms of the concave portions of the concavo-convex shape existing on the substrate surface. In addition, in the case of forming the fine metal wires by the oblique deposition method, the fine metal wires 27 are provided so as to distribute on one-side surfaces of the convex portions 23. Therefore, the period of the concavo-convex structure and the period (pitch P) of the fine metal wires 27 are substantially the same distance.

The period (pitch P between array of convex portions 23) of the concavo-convex structure (see FIG. 4) is not limited particularly, and it is preferable to make the period capable of exhibiting polarization separation characteristics. Generally, as the period of the fine metal wires 27 decreases, the wire grid polarizing plate exhibits excellent polarization separation characteristics in a wide band. In the case where the fine metal wire 27 contacts air (refractive index 1.0), by setting the period of the fine metal wires 27 at ⅓ to 4/1 the wavelength of target light, the plate exhibits practically sufficient polarization separation characteristics. Therefore, in the case of considering use of light in a visible light region, the period of the fine metal wires 27 and the period of the concavo-convex structure of the substrate 50a are preferably 150 nm or less, more preferably 130 nm or less, further preferably 120 nm or less, and most preferably 100 nm or less. The lower limit of the period of the fine metal wires 27 and the period of the concavo-convex structure of the substrate 50a are not particularly limited, and from the viewpoint of manufacturing easiness, the lower limit is preferably 50 nm or more, more preferably 60 nm or more, and further preferably 80 nm or more. As the period of the fine metal wires 27 is shorter, observation of the bright line B (see FIG. 3B) indicative of the polarization axis direction is easier, being preferable.

In addition, in the wire grid polarizing plate, it is preferable to provide the fine metal wires 27 to distribute on one-side surfaces of the array of convex portions 23 of the concavo-convex structure. Accordingly, the extension direction of the concavo-convex structure is substantially parallel to the extension direction of the fine metal wires 27. Further, it is essential only that the concavo-convex structure and fine metal wires 27 extend substantially in a predetermined direction, and it is not necessary that each of the concave portion, the convex portion and fine metal wire of the concavo-convex structure is strictly parallel with each other. Further, the period (pitch P) of the concavo-convex structure is preferably regular intervals except the region 16a (see FIG. 3A) different from the surroundings.

A method of manufacturing the substrate 50a having the concavo-convex structure on the surface is not particularly limited, and a manufacturing method using a metal stamper will be exemplified. In preparing the concavo-convex structure is used a silicon-based substrate and the like prepared by application of photolithography techniques of semi-conductor manufacturing. By using the photolithography techniques of semi-conductor manufacturing, it is possible to selectively prepare a region different from surroundings. Using a silicon-based substrate having a concavo-convex structure as a mold, a resin block having the concavo-convex structure on the surface is prepared. Next, using an electrodeposition method and the like, a metal stamper having the concavo-convex structure is prepared from the obtained resin block having the concavo-convex structure on the surface. UV light is applied, while pressing the metal stamper against a UV curable resin applied onto the substrate, and by transferring the concavo-convex structure onto the substrate, it is possible to prepare the substrate 50a having the concavo-convex structure on the surface. In addition, it is effective to coat the surface of the metal stamper with a mold release agent for contributing to releasability, and it is possible to use a fluorine-based or silicone-based mold release agent as appropriate. For example, among mold release agents are KF-965, KS-62F, KF-965SP, KS-7201, KS-707 (made by Sin-Etsu Silicone) and the like, and in addition thereto, there are DAIFREE and Optool (DSX, HD1100TH, HD2100TH, made by DAIKIN INDUSTRIES, LTD.) and the like.

As one of techniques for preparing the concavo-convex structure on the surface of the silicon-based substrate and the like, there is a method of sequentially transferring (exposing) so that patterns of reticle are adjacent without clearance. In the method, it is easy to generate the region different from surroundings selectively in a boundary (seam) between adjacent exposed regions.

It is essential only that the above-mentioned metal stamper is capable of being formed by transferring the concavo-convex structure to the surface of the substrate, and the outside shape thereof is not limited, and is capable of being a flat shape, cylindrical shape or other shape. In consideration of mass production characteristics, the cylindrical shape is preferable. By this means, a plate cylinder is provided with the cylindrical metal stamper as a block material, and it is possible to perform the roll process for consecutively forming the concavo-convex shape.

As a method of preparing the cylindrical metal stamper, for example, there is a technique for rounding a plate-shaped metal stamper in the shape of a cylinder to join end portions. In order to round with a certain curvature without providing the plate-shaped metal stamper with a fold, it is preferable to use three rolls and the like. Further, in order to easily attach or detach the metal stamper made the cylindrical shape, it is preferable to provide the plate cylinder (cylinder, shaft) with a function of expanding to fix the cylindrical metal stamper. In addition, in setting the metal stamper made the cylindrical shape on the plate cylinder, it is preferable that a cylindrical steel pipe with high circularity is cut in the extension direction to use as a spacer between the plate cylinder and the metal stamper. By this means, it is possible to expand the metal stamper, while maintaining the circular shape, and it is possible to increase the circularity of the metal stamper provided on the plate cylinder. As the spacer inserted in between the plate cylinder and the metal stamper, it is also possible to use films such as a silicone-based film and PET film with flexibility capable of filling the clearance, and of being used as a buffer of the convex-shaped protrusion on the inner side of the cylinder of the metal stamper made the cylindrical shape.

As described, as the substrate of the wire grid polarizing plate, films are preferable, and by this means, it is possible to actualize the roll process. The metal stamper prepared by making the plate-shaped metal stamper the cylindrical shape has a joint portion. In the case of using the cylindrical metal stamper, and performing the roll process for coating the film that is the substrate with a UV curable resin to transfer the concavo-convex structure, the joint portion is also transferred onto the film. In the film with the concavo-convex structure transferred, in the area with the joint portion of the metal stamper transferred, a thickness of the UV curable resin is different from that of surroundings. As the shape of the fine metal wire 27, it is preferable to form the fine metal wire 27 in the shape continued to the side surface of the convex portion and the bottom of the concave portion of the concavo-convex structure, and it is further preferable to form similar fine metal wires 27 inside the film surface. However, in the case of preparing the fine metal wire 27 by the oblique deposition method described later, in the area with the joint portion of the metal stamper transferred, since the thickness of the UV curable resin is different from that of surroundings, the shape of the fine metal wire formed by deposition of metal is different from that of the surroundings. In order to prevent the difference from occurring, it is preferable that a height H of the convex portion is set at 1.0 time or less the pitch P that is the distance between adjacent fine metal wires 27. When the height H of the convex portion 23 exceeds 1.0 time the pitch P, a difference tends to occur in polarization separation characteristics inside the sheet surface. Further, as the reflection type polarizing plate, in incident light, it is preferable that a reflection extinction ratio, which is calculated from reflectance of a polarization component parallel with the polarization reflection axis direction to reflectance of a polarization component orthogonal to the polarization reflection axis direction (polarization component parallel with the polarization transmission axis direction), is high. The image display device is the same, and to achieve the high ratio, it is preferable that the height H of the convex portion is 1.0 time or less the pitch P that is the distance between adjacent fine metal wires 27.

In addition, in the case of providing the above-mentioned concavo-convex structure on the substrate, and further preparing the region of the concavo-convex structure different from that of surroundings that is a feature of the present invention, even prior to preparation of the fine metal wire 27, it is possible to confirm diffracted light in macroscopic observation. For example, the concavo-convex structure of the nano-size has optical functions of suppressing surface reflection caused by a difference in the refractive index to exhibit low reflection characteristics, and exhibiting birefringence from a difference in the refractive index occurring between the extension direction of the concavo-convex structure and the orthogonal direction. The optical functions include the axis direction, and by using the present invention of using diffracted light (bright line) visually identified in macroscopic observation, it is possible to determine the axis direction difficult to make visual observation.

The fine metal wires 27 are formed on one-side surfaces of the array of convex portions 23 of the concavo-convex structure. By this means, it is possible to prepare the fine metal wires 27 continuously extending in a predetermined direction. It is possible to form the fine metal wire 27 using conductive materials such as aluminum, silver, copper, platinum, gold or an alloy of each of these metals as a main constituent. Particularly, aluminum is capable of decreasing an absorption loss in a visible region, and is thereby preferable. The method of preparing the fine metal wire 27 is not limited. For example, among the methods are an electron beam lithography method, a method of forming using mask patterning and dry etching by the interference exposure method, the method of preparing by the oblique deposition method and the like. From the viewpoint of productivity, the oblique deposition method is preferable.

The oblique deposition method is a method where in a section (hereinafter, abbreviated as a "sectional view") perpendicular to the extension direction of the concavo-convex structure, a deposition source exists in a direction inclined with respect to the perpendicular direction of the surface of the substrate, and the metal is deposited and stacked on the substrate, while maintaining a predetermined angle. As the deposition angle, a preferable range is determined from the convex portion of the concavo-convex structure and a cross-sectional shape of the fine metal wire to prepare. Generally, a range of 5 degrees to 45 degrees is preferable, and a range of 5 degrees to 35 degrees is more preferable. Further, it is suitable gradually decreasing or increasing the deposition angle, while considering a project ion effect of the metal deposited during deposition, to control the cross-sectional shape such as the height of the fine metal wire 27. In addition, in the case where the surface of the substrate 50a is curved, deposition may be performed in the direction inclined with respect to the normal line direction of the surface of the substrate 50a. Further, the shape of the deposition source is not limited, as long as the source enables the metal to be deposited sufficiently in a deposition target region, and it is possible to select an intermittent-point shape, and a continuous linear shape. In the case where the deposition source has the point shape, it is possible to also deposit from an inclined direction with respect to the extension direction of the concavo-convex structure, the distance of the concavo-convex structure is apparently widened, it is thereby possible to deposit up to the bottom of the concave portion, and such a shape is preferable.

Specifically, with respect to the perpendicular direction in the center of the deposition target region on the surface of the substrate 50a having, on the surface, the concavo-convex structure extending approximately parallel with a predetermined pitch in a particular direction, the center of the disposition source is provided in the direction with 5 degrees or more and less than 45 degrees, and the fine metal wire 27 is formed on the concavo-convex structure. It is further preferable to provide the center of the deposition source in the angle direction of 5 degrees or more and less than 35 degrees with respect to the perpendicular direction in the center of the deposition target region on the surface of the substrate 50a. By this means, it is possible to selectively provide the fine metal wire 27 on one of side surfaces of the convex portion 23 of the concavo-convex structure of the surface of the substrate 50a. In addition, in the case of depositing, while transporting the substrate 50a, deposition may be performed so that the center of the deposition target region at some instant and the center of the deposition source are under the above-mentioned condition.

In the case of using the above-mentioned oblique deposition method, the extension directions of the convex portion 23 of the concavo-convex structure and the fine metal wire 27 are the same. Further, the shape of the fine metal wire 27 in the cross-sectional view of the wire grid polarizing plate undergoes effects of the height H and width of the convex portion 23 of the concavo-convex structure providing the projection effect, and the metal deposition amount.

In order to prepare the region of the fine metal wire 27 with the structure (shape) different from that of surroundings, it is preferable to prepare a region of the concavo-convex structure different from surroundings, and it is suitable to make at least one of the height H and width of the convex portion 23 different from the surroundings. Further, in the concavo-convex structure, by making a depth (height) of the concave portion between adjacent convex portions 23 shallow (low), or making convex portions 23 of the extending concavo-convex structure intermittent, it is possible to prepare the region of the fine metal wire 27 with the structure different from that of surroundings. With respect to the region of the fine metal wire 27 with the structure (shape) different from that of surroundings, for example, it is possible to prepare the region, by making the width or height of the fine metal wire 27 different from that of peripheral fine metal wires 27. In addition thereto, it is also possible to prepare, by lacking a part of the fine metal wire 27.

From the viewpoint of facilitating observation of the bright line B (see FIG. 3B), the fine metal wire 27 having the structure different from that of surroundings has a structure where a width or height is preferably different in a range of 3% or more from that of peripheral fine metal wires 27, more preferably different in a range of 5% or more, further preferably different in a range of 10% or more, further more preferably different in a range of 15% or more, particularly preferably different in a range of 20% or more, and most preferably different in a range of 30% or more. The upper limit is not particularly limited, and the structure is preferably different in a range of 60% or less, more preferably different in a range of 50% or less, and further preferably different in a range of 40% or less. The region 16a (see FIG. 3A) having the structure where the width or height is different from that of peripheral fine metal wires 27 is preferably a linear region. From the viewpoint of facilitating observation of the bright line B, an area of the linear region 16a is preferably 1,000 nm$^2$ or more, more preferably 2,000 nm$^2$ or more, further preferably 5,000 nm$^2$ or more, further more preferably 10,000 nm$^2$ or more, and most preferably 100,000 nm$^2$ or more.

A length of a part where a width of the metal is the thickest in a cross-sectional view of the fine metal wire 27 is assumed to be a width of the fine metal wire 27 in the portion of the cross-sectional view. Similarly, a length of a part where a height of the metal is the highest in a cross-sectional view of the fine metal wire 27 is assumed to be a height of the fine metal wire 27 in the portion of the cross-sectional view.

From the viewpoint of facilitating observation of the bright line B, the concavo-convex structure of the substrate 50a preferably has the convex portion 23 with the structure different from that of peripheral convex portions 23, and has a structure where a width or height is preferably different in a range of 3% or more from that of peripheral metal convex portion 23, more preferably different in a range of 5% or more, further preferably different in a range of 10% or more, further more preferably different in a range of 15% or more, particularly preferably different in a range of 20% or more, and most preferably different in a range of 30% or more. The upper limit is not particularly limited, and the structure is preferably different in a range of 60% or less, more preferably different in a range of 50% or less, and further preferably different in a range of 40% or less. The region 16*a* having the structure where the structure is different from that of peripheral convex portions 23 is preferably a linear region. From the viewpoint of facilitating observation of the bright line B, an area of the linear region 16*a* is preferably 1,000 nm$^2$ or more, more preferably 2,000 nm$^2$ or more, further preferably 5,000 nm$^2$ or more, further more preferably 10,000 nm$^2$ or more, and most preferably 100,000 nm$^2$ or more.

A length of a part where a width of the convex portion 23 is the thickest in a cross-sectional view of the convex-concavo structure of the substrate 50*a* is assumed to be a width of the convex portion 23 in the portion of the cross-sectional view. Similarly, a length of a part where a height of the convex portion 23 is the highest in a cross-sectional view of the concavo-convex structure of the substrate 50*a* is assumed to be a height of the convex portion 23 in the portion of the cross-sectional view.

The step of forming the fine metal wire 27 having the structure different from that of peripheral fine metal wires 27 may be at the same time or a different step as/from the step of forming the peripheral fine metal wires 27. Further, the step of forming the convex portion 23 having the structure different from that of peripheral convex portions 23 on the substrate 50*a* may be at the same time or a different step as/from the step of forming the concavo-convex structure on the substrate 50*a*.

Figure 9:
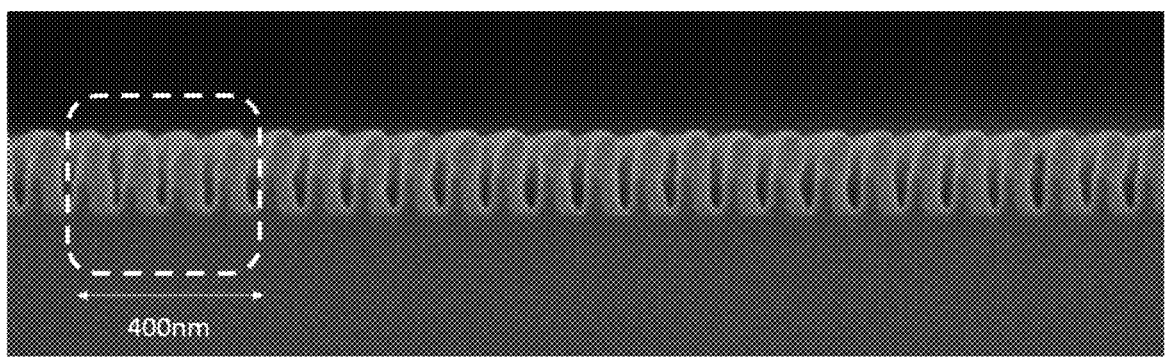
FIG. 9 is a cross-sectional view of the wire grid polarizing plate where a region of a fine metal wire with a structure (shape) different from surroundings by making a height of the fine metal wire lower than in the surroundings.
Figure 9:
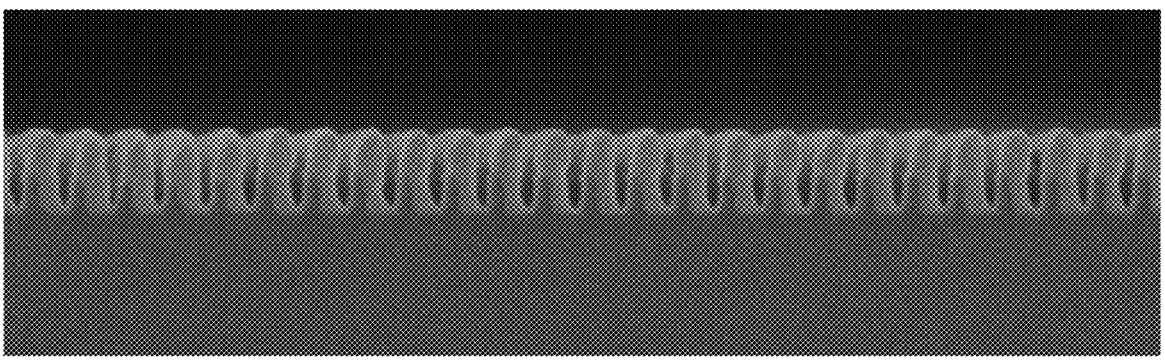

FIG. 9 is a cross-sectional view of the wire grid polarizing plate where the region of the fine metal wire with the structure (shape) different from that of surroundings was prepared by making the height of the fine metal wire lower than that of surroundings. The dotted-line portion in FIG. 9 is the region of the fine metal wire with the structure (shape) different from that of surroundings.

Figure 10:
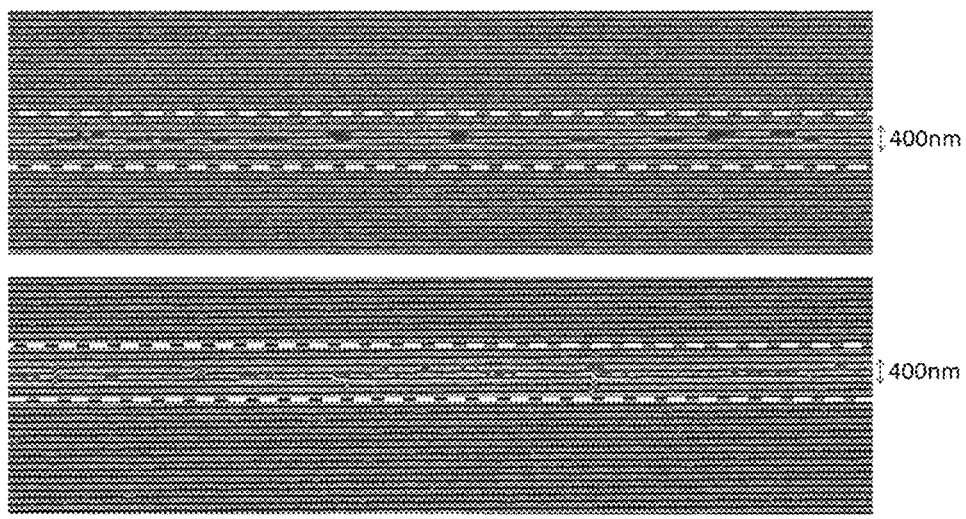
FIG. 10 is a plan view of the wire grid polarizing plate where the region of the fine metal wire with a structure (shape) different from surroundings by making a width of the fine metal wire thicker than in the surroundings.

FIG. 10 is a plan view of the wire grid polarizing plate where the region of the fine metal wire with the structure (shape) different from that of surroundings was prepared by making the width of the fine metal wire thicker than that of surroundings. The dotted-line portion in FIG. 10 is the abnormal structure region including a plurality of fine metal wires with the structure (shape) different from that of surroundings. With respect to a width in the perpendicular direction to the direction in which the fine metal wires of the abnormal structure region extend, from the viewpoint of facilitating observation of the bright line indicative of the polarization axis direction, the width is preferably a length of a wavelength or less of light desired for polarization separation. In more detail, this width preferably ranges from 50 nm to 800 nm, more preferably from 100 nm to 600 nm, and further more preferably from 100 nm to 500 nm. In FIG. 10, the width in the perpendicular direction to the direction in which the fine metal wires of the abnormal structure region extend is the width of the dotted-line portion, and is 400 nm. The preferable ranges of the height and width of the structure different from that of surroundings are the same as the ranges previously described.

Figure 11:
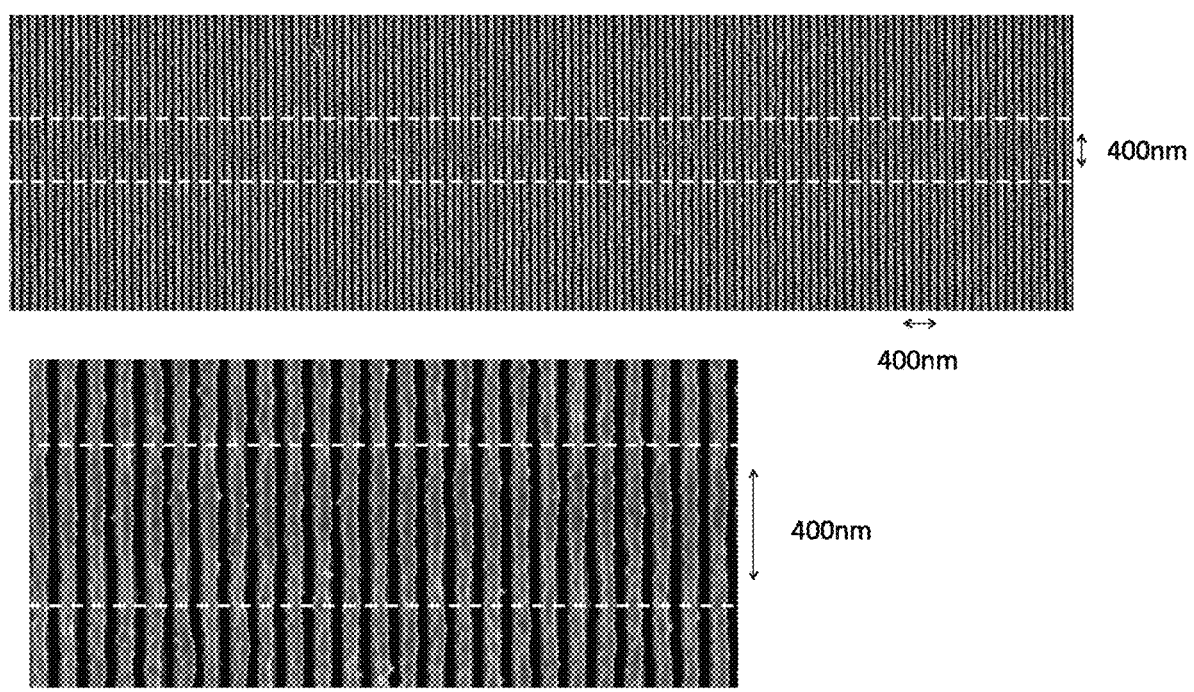
FIG. 11 is a plan view of the wire grid polarizing plate where the region of the fine metal wire with a structure (shape) different from surroundings by lacking a part of the fine metal wire.

FIG. 11 is a plan view of the wire grid polarizing plate where the region of the fine metal wire with the structure (shape) different from that of surroundings was prepared by lacking a part of the fine metal wire. The dotted-line portion in FIG. 11 is the abnormal structure region including a plurality of fine metal wires with the structure (shape) different from that of surroundings. With respect to a width in the direction in which the fine metal wires of the abnormal structure region extend, from the viewpoint of facilitating observation of the bright line indicative of the polarization axis direction, the width is preferably a length of a wavelength or less of light desired for polarization separation. In more detail, this width preferably ranges from 50 nm to 800 nm, more preferably from 100 nm to 600 nm, and further more preferably from 100 nm to 500 nm. In FIG. 11, the width in the direction in which the fine metal wires of the abnormal structure region extend is the width of the dotted-line portion, and is 400 nm. The preferable ranges of the height and width of the structure different from that of surroundings are the same as the ranges previously described.

Figure 7:
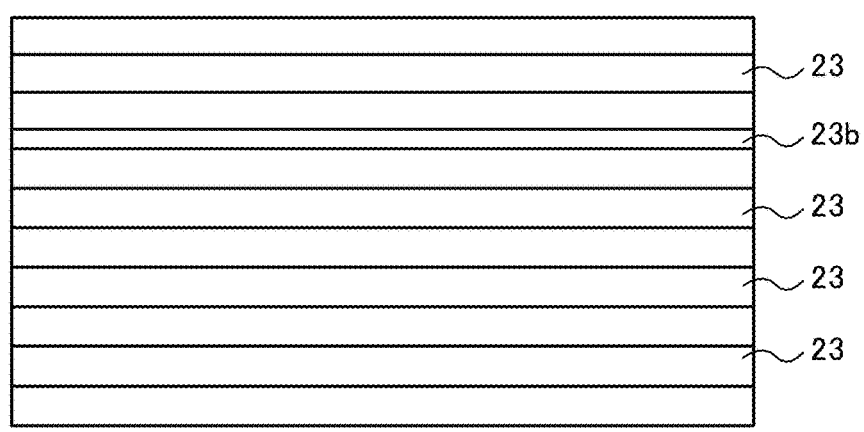
FIG. 7 shows one example of the plan schematic view illustrating the surface of the wire grid polarizing plate of this Embodiment.

For example, as shown in FIG. 7, among the array of convex portions 23, in an array of convex portion 23*b*, a convex-portion width is narrower than the width of peripheral convex portions 23. FIG. 7 illustrates the configuration except the fine metal wire 27 and dielectric layer 26. Accordingly, in FIG. 7 appears the surface shape of the concavo-convex structure formed on the substrate. In addition, instead of that the convex-portion width is not narrow in the entire region in the extension direction of the array of convex portions 23*b*, a configuration may be adopted where the convex-portion width is narrow in a part of the region of the array of convex portion 23*b*, and the region with the narrow convex-portion width extends in the extension direction of the concavo-convex structure.

Alternatively, a configuration may be adopted where the convex-portion width among the array of convex portions 23 is wider than that of peripheral array of convex portions 23, and such a region with the wide convex-portion width extends in the extension direction of the concavo-convex structure. By this means, in macroscopic observation, for example, it is possible to observe the bright line B as the indicator indicative of the polarization axis direction.

Further, it is preferable that a metal deposition amount (average thickness) ranges from about 50 nm to 300 nm. In addition, the average thickness described herein refers to a thickness of deposition substances when it is assumed that a substance is deposited on the glass surface on the smooth glass substrate from the perpendicular direction, and is used as an index of the metal deposition amount.

Further, from the viewpoint of optical properties, apart unnecessary for the fine metal wire 27 may be removed by etching. The etching method is not limited particularly, as long as the method does not exert an adverse effect on the substrate 50*a* and dielectric layer 26, and is capable of selectively removing the metal portion. From the viewpoint of productivity, a method of immersing in an alkali aqueous solution is preferable, but since the fine metal wire 27 is prepared to be extremely thin, the above-mentioned etching is not indispensable.

In order to improve adhesion between materials forming the substrate 50*a* and the fine metal wire 27, it is possible to provide the electric layer 26 high in adhesion with both the substrate and the wire in therebetween. By this means, by enhancing adhesion between the substrate 50*a* and the fine metal wire 27, it is possible to prevent the fine metal wire 27 from peeling off. For example, among dielectrics suitably used are oxides, nitrides, halides and carbides of silicon (Si) alone or complex thereof (dielectric obtained by mixing another element, a single substance or compound into a dielectric alone), and oxides, nitrides, halides and carbides of metal such as aluminum (Al), chromium (Cr), yttrium (Y), zirconium (Zr), tantalum (Ta), titanium (Ti), barium (Ba), indium (In), tin (Sn), zinc (Zn), magnesium (Mg), calcium (Ca), cerium (Ce) and copper (Cu) alone or complex thereof. It is preferable that dielectric materials are substantially transparent in a wavelength region targeted for transmission polarization performance. A layering method of dielectric materials is not limited particularly, and for example, it is possible to suitably use a physical vapor deposition method such as a vacuum deposition method, sputtering method and ion plating method.

Further, from the viewpoints of resistance to moist heat and antifouling property, it is preferable to provide a coating layer on the surface with the fine metal wire 27 prepared. By the coating layer, resistance is improved to oxidation deterioration by direct water molecules to the fine metal wire 27 of the wire grid polarizing plate, and also in space inside the vehicle where the head-up display device is installed, it is possible to exert continuous resistance to moist heat. Materials and forming method of the coating layer are not limited particularly, as long as the materials and method are capable of improving resistance to moist heat of electric conductors, and there are materials and preparation methods as described in Japanese Unexamined Patent Publication No. 2014-85516. The materials of the coating layer are not limited particularly, and among the materials are inorganic materials such as silicon, silicon nitride, silicon oxide, silicon carbide and diamond-like carbon, metal oxides such as titanium oxide and indium tin oxide (ITO), fluorine-containing compounds such as fluorine-based organic molecules containing perfluoro-ether groups, perfluoro-alkyl groups and the like, etc. Further, in order to prevent transmittance from decreasing prior and subsequent to deposition of the coating layer, the materials are preferably materials that do not exhibit absorption substantially at least in a target wavelength region. The method of forming the coating layer is not limited particularly, and it is possible to suitably use dry methods such as the vacuum deposition method, sputtering method and ion plating method, wet methods such as a vapor diffusion method, liquid dripping method and liquid immersion method and the like. Particularly preferable dry methods are the vacuum deposition method and sputtering method which allow thin and uniform film formation, and are apt to enhance physical adhesion by substance collision, and to follow the shape of the concavo-convex structure. In the case of using reactive materials, after depositing on the fine metal wire 27, aging may be performed at predetermined temperature and humidity for promoting the reaction. The coating layer is preferably coated on not only a top portion of the fine metal wire 27, but also on the entire surface of the fine metal wire 27 and the surface of the substrate 50*a* having the concavo-convex structure at the same time. The layer configuration of the coating layer may be a single-layer configuration comprised of a single composition, may be a multi-layer configuration comprised of a plurality of layers, or may be comprised of a layer obtained by mixing a plurality of compositions. Particularly, from the viewpoint of adhesion between the coating layer and the fine metal wire 27, the coating layer preferably has a first coating layer containing at least one of inorganic materials and metal oxide materials, and a second coating layer comprised of a fluorine-containing composition for coating at least the surface of the first coating layer. In the above-mentioned configuration, a thickness of the first coating layer is preferably a thickness of 20 nm or less to prevent transmittance and polarization performance from decreasing prior and subsequent to coating, and is more preferably 15 nm or less to prevent a crack due to folding after coating from occurring. Further, in order to fix to the first coating layer with stability, the second coating layer preferably has reactive groups at terminals of the molecular structure. A thickness of the second coating layer is preferably 5 nm or less, and more preferably 3 nm or less. In addition, in the case of the vapor diffusion method, it is also possible to treat the surface of the entire part after preparing the wire grid polarizer. In the wire grid polarizer with the wire grid polarizing plate stuck to the glass substrate, the second coating layer is a surface layer of the glass substrate surface, the second coating layer comprised of the fluorine-containing composition is capable of being made a low refractive index, and it is thereby possible to reduce interface reflection.

In the above-mentioned wire grid polarizing plate, the substrate 50*a* is a film. In the reflection type polarizing plate 15 used in the image display device 1 (see FIG. 2) of this Embodiment, since the function of reflecting image light is also required, corresponding to design of the image display device 1, it is also possible to apply sticking processing to the flat-shaped glass substrate, and to perform heat forming after performing sticking processing on a resin plate. Hereinafter, exemplified is the wire grid polarizer where the wire grid polarizing plate is stuck and processed to the flat-shaped glass substrate.

As the method of sticking and processing the wire grid polarizing plate to the flat-shaped glass substrate, for example, three are a method of sticking a protective film to the surface having the fine metal wire 27 of the wire grid polarizing plate, performing sticking processing onto the flat-shaped glass substrate after applying cohesive processing to the surface with the substrate 50*a* exposed without having the fine metal wire 27, and finally peeling off the protective film, and the like.

In the above-mentioned sticking method, from the viewpoint of reducing internal residual stress of the film (resin materials) that is the substrate, and of aging of the above-mentioned coating layer, it is preferable to apply heat treatment. Depending on used materials, by placing in an environment of about 100° C. to 140° C. for about minutes to 2 hours, it is possible to improve environmental resistance properties after assembling into the head-up display device 1.

Among the protective films are films having weak cohesive silicone-based cohesive layers, acryl-based cohesive layers, and urethane-based cohesive layers, and the like, and among specific examples thereof are Prosave SQ (Registered Trademark) (50SQ, 50SQD), Prosave RC® (25THS) and Prosave EP (Registered Trademark) (75LS, 75MS) made by KIMOTO Corporation and the like. Particularly, in the wire grid polarizing plate having the coating layer, from the viewpoints of adhesion and staining properties to the coating layer, it is preferable to use the protective film having the acryl-based cohesive layer.

Further, before the sticking processing, it has an effect on improvements in adhesion strength to apply surface treatment such as corona treatment to the surface with the exposed substrate 50*a* without having the fine metal wire 27 of the wire grid polarizing plate. In the case where the substrate 50*a* is COP, in order to prevent the fine metal wire 27 from separating from the concavo-convex structure of the substrate 50*a*, it is preferable to adjust processing conditions so that a discharge amount calculated from a discharge electrode length, substrate film transport velocity and discharge power is equivalent to 10~120 W·min/m$^2$. Further, from the viewpoint of preventing the fine metal wire 27 from separating, it is also effective to insert a flat-shaped resin plate having a further sufficient thickness in between the electrode that the corona treatment apparatus has and the dielectric, and apply surface treatment to the surface with the exposed substrate 50*a* of the wire grid polarizing plate.

As cohesive materials used in cohesive processing, it is possible to use a double-sided adhesive tape with the both sides coated with release paper. It is possible to use materials having transparency for enabling light with a target wavelength to be transmitted, without problems, and for example, among suitably used materials are CS9861US, CS9862UA and HJ-9150W made by NITTO DENKO CORPORATION, MO-T015, MO-3005, MO-3006 and MO-3014 made by Lintec Corporation, 5405X-75 made by SEKISUI CHEMICAL CO., LTD. and the like. In addition, in the case of sticking the wire grid polarizing plate where the substrate 50a is a film to the glass substrate, it is necessary to consider expansion and contraction of the film associated with a change in environmental temperature. When the glass substrate warps due to a difference in the coefficient of expansion between the glass substrate and the film, in the case of using the wire grid polarizer as a mirror for performing polarization reflection, there is fear that distortion occurs in the projected image. In order to suppress occurrences of the warp of the glass substrate, cohesive materials having flexibility are effective, and among preferable materials are the materials formed of the acryl-based resin, and cohesive materials formed of the silicone-based resin as described above. Further, from the viewpoint of holding flexibility, a thickness of the cohesive material is preferable 50 μm or more. On the other hand, when the cohesive material is excessively thick, since it is difficult to ensure the mirror surface property (surface smoothness), the thickness of 100 μm or less is preferable.

The glass substrate targeted for sticking essentially has flatness capable of actualizing the mirror surface property required for the wire grid polarizer by the image display device 1 of this Embodiment, and further, preferably has the property capable of transmitting or absorbing light passing through the wire grid polarizing plate. Further, the plate preferably contains a small content of alkali component. In the case of using a glass substrate containing a large amount of alkali component such as soda-lime glass, the alkali component dissolves by repeating moisture condensation and dry, and possibilities occur that the component pollutes the glass substrate surface, and corrodes the metal wire forming the wire grid polarizing plate.

After sticking and processing the wire grid polarizing plate to the glass substrate, it is preferable to perform autoclave processing and annealing processing to enhance adhesion between the glass substrate and the cohesive material.

INDUSTRIAL APPLICABILITY

It is possible to suitably use the head-up display device of the present invention as the head-up display system for vehicles or other applications.

The present application is based on Japanese Patent Application No. 2017-204880 filed on Oct. 24, 2017, the entire content of which is expressly incorporated by reference herein.

The invention claimed is:

1. A wire grid polarizing plate comprising:
a plurality of fine metal wires each extending in a predetermined direction to form a fine metal wire region so that a polarization reflection axis direction of the wire grid polarizing plate is substantially parallel to the predetermined direction; and
a plurality of different fine metal wires that are directly adjacent to each other, each having a structure different from that of peripheral fine metal wires of the plurality of fine metal wires, the plurality of different fine metal wires being provided within the fine metal wire region so as to form an abnormal structure region for emitting diffracted light in reflection observation, and the plurality of different fine metal wires in the abnormal structure region being configured to emit the diffracted light as a line that corresponds to a polarizing direction of the surface having the fine metal wire region.

2. The wire grid polarizing plate according to claim 1, wherein each of the different fine metal wires is at least one selected from the group consisting of a fine metal wire provided in the wire grid polarizing plate to form a broken line, and a fine metal wire having a width or a height different from that of the peripheral fine metal wires.

3. The wire grid polarizing plate according to claim 2, wherein each of the plurality of different fine metal wires is the fine metal wire having a width or a height different from that of the peripheral fine metal wires.

4. The wire grid polarizing plate according to claim 1, wherein an extension direction of each of the plurality of different fine metal wires is substantially parallel with the predetermined direction in which the plurality of fine metal wires extend.

5. The wire grid polarizing, plate according to claim 1, wherein each of the plurality of different fine metal wires has a width or a height different in a range of 3% or more from that of the peripheral fine metal wires.

6. The wire grid polarizing plate according to claim 5, wherein each of the plurality of different fine Metal wires has a structure where the width or the height of the fine metal wire is different in a range of 3% to 60% from that of the peripheral fine metal wires.

7. The wire grid polarizing plate according to claim 1, wherein a distance between the fine metal wires m the fine metal wire region ranges from 50 nm to 150 nm.

8. The wire grid polarizing plate according to claim 1, further comprising:
a substrate having a concavo-convex structure extending in a particular direction on a surface thereof, wherein the plurality of fine metal wires is provided on the concave-convex structure of the substrate.

9. The wire grid polarizing plate according to claim 8, wherein the plurality of fine metal wires is provided to be unevenly distributed on one-side surfaces of convex portions of the concave-convex structure of the substrate.

10. The wire grid polarizing plate according to claim 8, wherein the concavo-convex structure of the substrate includes a convex portion having a structure different from that of peripheral convex portions.

11. The wire grid polarizing plate according to claim 8, wherein the concavo-convex structure of the substrate includes the convex portion having a structure where a width or a height is different in a range of 3% to 60% from that of the peripheral convex portions.

12. The wire grid polarizing plate according to claim 8, wherein a distance between convex portions of the concavo-convex structure of the substrate ranges from 50 nm to 150 nm.

13. The wire grid polarizing plate according to claim 1, wherein each of the plurality of different fine metal wires has a portion having a length ranges from 50 nm to 800 nm.

14. The wire grid polarizing plate according to claim 13, wherein the length of the portion of each of the plurality of different line metal wires is the same as or less than a wavelength of light desired for polarization separation.

15. The wire grid polarizing plate according to claim 1, wherein a width of the abnormal structure region, in a direction perpendicular to a direction in which the different fine metal wires extend, ranges from 50 nm to 800 nm.

16. The wire grid polarizing plate according to claim 1, wherein a width of the abnormal structure region in a direction perpendicular to a direction in which each of the plurality of different fine metal wires extends is the same as or less than a wavelength of light desired for polarization separation.

17. The wire grid polarizing, plate according to claim 1, wherein a width of the abnormal structure region in a direction, in which the different fine metal wires of the abnormal structure region extend, ranges from 50 nm to 800 nm.

18. The wire grid polarizing plate according to claim 1, a width of the abnormal structure region in a direction in which the fine metal wires of the abnormal structure region extend is the same as or less than a wavelength of light desired for polarization separation.

19. A method of observing a polarizing direction of the fine metal wire region of the wire grid polarizing plate of claim 1, the method comprising:
    applying light to a surface having the fine metal wire region of the wire grid polarizing plate; and
    observing the surface having the fine metal wire region of the wire grid polarizing plate from an angle that is not a regular reflection direction of the light applied, so as to observe the line that corresponds to a polarizing direction of the surface having the fine metal wire region.

20. The method according to claim 19, wherein a polarization axis direction of a wire grid polarizing plate is estimated by the observation.

21. A method of manufacturing a wire grid polarizing plate having a fine metal wire region, comprising:
    a fine metal wire forming step of forming a plurality of fine metal wires extending in a predetermined direction on a substrate to form the fine metal wire region; and
    a step of forming a plurality of different fine metal wires that are directly adjacent to each other, each having a structure different from that of peripheral fine metal wires on the substrate to be included in the fine metal wire region at a same time as, or at a different step from, the fine metal wire forming step, so that the plurality of different fine metal wires are formed within the fine metal wire region and provide Han an abnormal structure region for emitting diffracted light in reflection observation, wherein the diffracted light is a line that corresponds to a polarizing direction of the surface having the fine metal wire region.

22. The method of manufacturing the wire grid polarizing plate according to claim 21, further comprising:
    a concavo-convex structure forming step of forming a concavo-convex structure extending in the predetermined direction on the substrate; and
    a step of forming a convex portion having a structure different from that of peripheral convex portions on the substrate at a same time or a different step as/from the concavo-convex structure forming step.

23. The method of manufacturing the wire grid polarizing plate according to claim 21, wherein the plurality of fine metal wires contains aluminum.

* * * * *